United States Patent
Mestdagh

(10) Patent No.: US 7,280,465 B2
(45) Date of Patent: Oct. 9, 2007

(54) FREQUENCY ASSIGNMENT IN ORTHOGONAL MULTICARRIER MODULATION

(75) Inventor: Denis J. Mestdagh, Saint Martin d'Uriage (FR)

(73) Assignee: STMicroelectronics S.A., Montrouge (FR)

( * ) Notice: Subject to any disclaimer, the term of this patent is extended or adjusted under 35 U.S.C. 154(b) by 978 days.

(21) Appl. No.: 10/163,154

(22) Filed: Jun. 5, 2002

(65) Prior Publication Data

US 2002/0196732 A1 Dec. 26, 2002

(30) Foreign Application Priority Data

Jun. 6, 2001 (FR) .................................. 01 07394

(51) Int. Cl.
*H04J 1/00* (2006.01)
*H04J 11/00* (2006.01)
*H04B 7/216* (2006.01)
*G06F 15/16* (2006.01)

(52) U.S. Cl. ...................... 370/206; 370/203; 370/335; 370/480; 709/251

(58) Field of Classification Search ........ 370/203–210, 370/318–343, 442–480, 503–509; 709/207, 709/251
See application file for complete search history.

(56) References Cited

U.S. PATENT DOCUMENTS

| 4,955,021 | A | * | 9/1990 | Wei | .............................. 370/401 |
| 5,185,591 | A | | 2/1993 | Shuey | |
| 5,333,267 | A | * | 7/1994 | Sweazey | ...................... 709/251 |
| 5,557,612 | A | | 9/1996 | Bingham | |
| 5,625,651 | A | | 4/1997 | Cioffi | |
| 5,644,573 | A | | 7/1997 | Bingham et al. | |
| 5,933,454 | A | | 8/1999 | Cioffi | |
| 6,192,026 | B1 | * | 2/2001 | Pollack et al. | ............... 370/203 |
| 6,282,167 | B1 | | 8/2001 | Michon et al. | |
| 6,292,475 | B1 | * | 9/2001 | Swail | ......................... 370/329 |
| 6,430,148 | B1 | * | 8/2002 | Ring | ........................... 370/208 |
| 6,542,460 | B1 | * | 4/2003 | Ring | ........................... 370/203 |
| 6,661,771 | B1 | * | 12/2003 | Cupo et al. | .................. 370/204 |
| 6,707,856 | B1 | * | 3/2004 | Gardner et al. | .............. 375/260 |
| 6,735,221 | B1 | * | 5/2004 | Cherubini | .................... 370/485 |
| 6,862,297 | B1 | * | 3/2005 | Gardner et al. | .............. 370/503 |

(Continued)

FOREIGN PATENT DOCUMENTS

EP 0 933 897 A2 8/1999

(Continued)

OTHER PUBLICATIONS

French Search Report from French Patent Application 01/07394, filed Jun. 6, 2001.

(Continued)

*Primary Examiner*—Man U. Phan
(74) *Attorney, Agent, or Firm*—Lisa K. Jorgenson; William R. McClellan; Wolf, Greenfield & Sacks, P.C.

(57) ABSTRACT

A method for transmitting data between two nodes of an orthogonal frequency-division multiplexing network, including assigning to each node at least one transmit frequency set and one receive frequency set, the transmit set of each node being different from its own receive set; and using each node as a relay for transmitting back a transmission which is not intended for it.

24 Claims, 1 Drawing Sheet

U.S. PATENT DOCUMENTS

| | | | |
|---|---|---|---|
| 6,930,989 B1* | 8/2005 | Jones IV et al. | 370/335 |
| 7,002,934 B2* | 2/2006 | Dolgonos et al. | 370/328 |
| 7,042,897 B1* | 5/2006 | Sivaprakasam et al. | 370/462 |
| 7,082,159 B2* | 7/2006 | Larsson | 375/224 |
| 2001/0053124 A1* | 12/2001 | Ichihara et al. | 370/206 |
| 2002/0055356 A1* | 5/2002 | Dulin et al. | 455/422 |
| 2003/0031120 A1* | 2/2003 | Miyato et al. | 370/203 |
| 2003/0152020 A1* | 8/2003 | Schulze et al. | 370/206 |
| 2004/0252630 A1* | 12/2004 | Alapuranen | 370/208 |
| 2005/0068886 A1* | 3/2005 | Wang et al. | 370/210 |
| 2005/0276339 A1* | 12/2005 | Chow et al. | 375/260 |

FOREIGN PATENT DOCUMENTS

| | | |
|---|---|---|
| EP | 1 021 012 A1 | 7/2000 |
| EP | 1 065 818 A1 | 1/2001 |
| FR | 2 797 131 A1 | 2/2001 |
| GB | 2 332 602 A1 | 6/1999 |
| WO | WO99 23764 A1 | 5/1999 |

OTHER PUBLICATIONS

Mestdagh D.J. et al., "Zipper VSDL: A Solution For Robust Duplex Communication Over Telephone Lines" IEEE Communications Magazine, vol. 38, No. 5, May 2000, pp. 90-96, Piscataway, NJ, US ISSN: 0163-6804.

Gardner, Steve, et al. "Homeplug Standard Brings Networking to the Home," downloaded from CommsDesign website, www.commsdesign.com, dated Jan. 3, 2001.

* cited by examiner

FREQUENCY ASSIGNMENT IN ORTHOGONAL MULTICARRIER MODULATION

BACKGROUND OF THE INVENTION

1. Field of the Invention

The present invention relates to the field of shared point-to-multipoint or multipoint-to-multipoint communication networks and, more specifically, to orthogonal frequency division multiple access communication networks (FDMA or FDD).

The present invention will be described hereafter in relation with an example of application to networks using the electric supply conductors (for example, the mains) as a transmission medium. High-frequency carriers which are modulated to transmit data between two or several devices equipped with modems (modulator-demodulator) and connected to the mains are generally used. Such networks may be used, for example, to connect a microcomputer to its peripherals (printer, scanner, etc.). They may also distribute, inside of a home, an office, or the like, multimedia data coming from a connection to an external access, for example, a satellite antenna, an optical fiber cable, a modem cable, an XDSL modem, etc.

2. Discussion of the Related Art

Conventionally, the standards relative to networks using the supply system as a transmission support provide the combined use of a frequency-division multiple access and of a time-division multiple access. This actually is a carrier detection and collision or anticollision detection multiple access (CSMA/CA). According to these transmission standards, the frequency division multiple access is implemented by using an orthogonal frequency-division multiplexing (OFDM).

This is a well known technique which will be briefly described hereafter. Reference can also be made to literature. For example, article "HomePlug Standard Brings Networking to the Home" by Steve Gardner, Brian Markwalter, and Larry Yonge, published in December 2000 in Communication Systems Design, and incorporated herein by reference, discusses the application of such a multiplexing to networks using electric power cables as a transmission support.

The OFDM waveforms are generated by using inverse Fourier transforms (IFFT) in which the points of the frequency field are formed by complex sets of symbols which modulate each carrier. The result of the inverse Fourier transform is called an OFDM symbol. On the receive side, the data are reconstituted from a direct Fourier transform which converts the OFDM symbol in the frequency field. It should be noted that of this processing remain digital.

Each modem connected to any node of the network must be able to send data to any other node and to receive data coming from any other node.

Since various devices may simultaneously need to transmit information over the shared network, an access control mechanism of the transmission means (MAC) is necessary to avoid collisions which would result in information losses. Further, since different multimedia services or transmission types are likely to use the same electric supply conductors and since these different transmissions most often have distinct constraints in terms of delay, bit error rate, etc., an access priority management mechanism more generally designated as a quality-of-service control (QOS) is generally used.

In a frequency-division multiple access, each network node (that is, each modem connected to the network) is assigned a predefined set of frequencies to transmit data. On the receive side, there exist two solutions. Either a communication control channel is used to indicate which frequencies must be received and demodulated by each device connected to the multipoint-to-multipoint network. Or all receive frequencies are demodulated by all devices and each receive device selects the information intended thereto.

A specificity of networks using the supply conductors as a transmission support is that the network transfer function considerably varies along time (for example, under the effect of the plugging of an electric device, be it or not equipped with a modem), that the transfer function varies from one node to another, and the fact that it is a multiple-path and multiple-reflection network. As a result, the transmissions of a modem in a frequency set risk being randomly polluted, preventing proper reception by another modem.

SUMMARY OF THE INVENTION

The present invention aims at providing a novel data transmission technique by orthogonal frequency-division multiplexing which overcomes the disadvantages of conventional techniques.

The present invention more specifically aims at enabling use of Fourier transform circuits of reduced cost and size.

The present invention also aims at improving the network reliability despite random variations of its transfer function.

To achieve these and other objects, the present invention provides a method for transmitting data between two nodes of an orthogonal frequency-division multiplexing network, including the steps of:

assigning to each node at least one transmit frequency set and one receive frequency set, the transmit set of each node being different from its own receive set; and using each node as a relay for transmitting back a transmission which is not intended for the node.

According to an embodiment of the present invention, each set is assigned only once in transmission for the entire network.

According to an embodiment of the present invention, each set is assigned only once in reception for the entire network.

According to an embodiment of the present invention, each node is assigned at least two transmit sets and at least two receive sets.

According to an embodiment of the present invention, the receive sets of a node correspond to the transmit sets of at least two other distinct nodes.

According to an embodiment of the present invention, the transmit sets of a node correspond to receive sets of at least two other distinct nodes.

According to an embodiment of the present invention, a node of rank i ranging between 1 and n is assigned in transmit mode the k frequency sets of rank k(i−1)+1 to ki, where k represents the number of sets assigned in each direction to each node and the frequency sets are numbered from 1 to kn.

According to an embodiment of the present invention, a cyclic prefix and a cyclic suffix reproducing a predetermined number of samples, respectively of the end and of the beginning of the symbol, are added to each transmitted symbol.

According to an embodiment of the present invention, the times of symbol transmission beginning from all nodes are synchronized.

According to an embodiment of the present invention, the symbols to be transmitted are shaped to avoid intercarrier interference.

The present invention also provides a modem of an orthogonal frequency-division multiplexing transmission network.

According to an embodiment of the present invention, the modem includes means for detecting, in a transmitted message, whether the modem is the addressee of the message and, if not, for transmitting the message to another network node on another frequency set.

The foregoing objects, features and advantages of the present invention will be discussed in detail in the following non-limiting description of specific embodiments in connection with the accompanying drawings.

DETAILED DESCRIPTION

Figure 1:
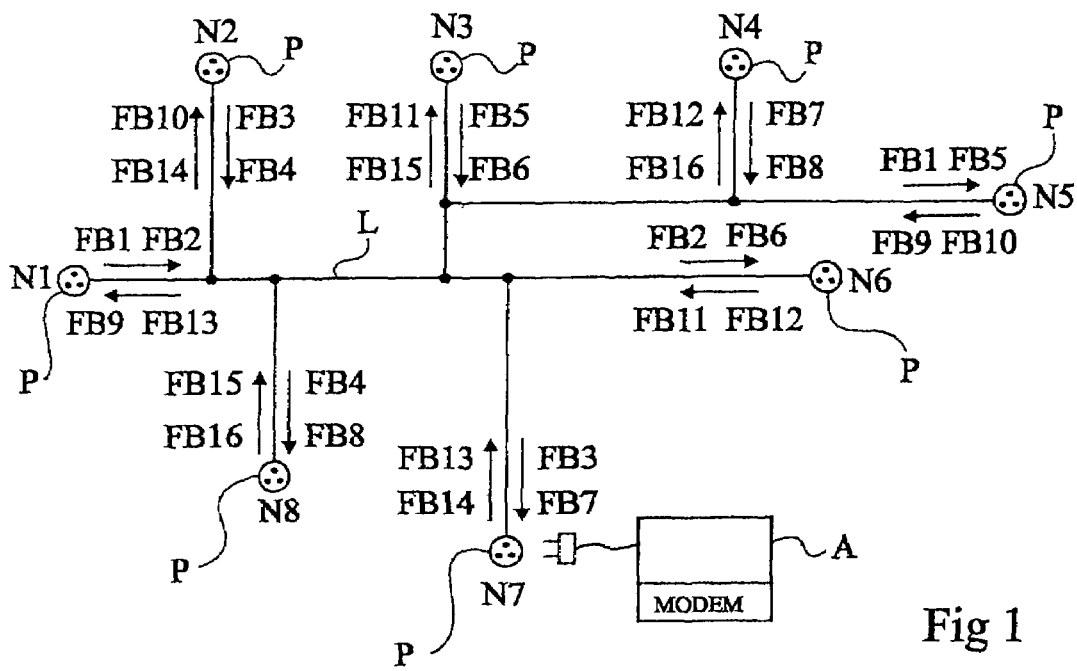
FIG. 1 very schematically shows a transmission network with eight nodes according to a preferred embodiment of the present invention.

The same elements have been designated with the same references in the different drawings. For clarity, only those elements and those steps of the method which are useful to the understanding of the present invention have been shown in the drawings and will be described hereafter. In particular, the data to be transmitted and their possible coding have not been detailed. The data to be transmitted and the possible coding of these data as well as their transmission protocols depend on the applications, and the present invention may be implemented whatever these types of data and transmission protocols. Further, the access control mechanisms and other mechanisms necessary to the network operation (for example, priority management, etc.) have not been detailed and their implementation is within the abilities of those skilled in the art, using conventional means. Further, the internal structure of each modem has not been described. It is conventional, unless otherwise specified.

According to the present invention, each node of the network is assigned at least one frequency set for its transmissions and at least one receive frequency set. The transmit and receive frequency sets are different from one node to the other and the transmit frequencies are different from the receive frequencies for a same node. This amounts to saying that each node is assigned only once for the entire network as a transmit set and only once for the entire network as a receive set.

A feature of the present invention is that each node is used as a relay for a transmission that it receives and which is not intended for it.

Preferably, each node is assigned, while respecting the above conditions, at least two transmit frequency sets and at least two receive frequency sets. The minimum number of different frequency sets then corresponds to twice the number of network nodes.

FIG. 1 very schematically shows an example of an architecture of a transmission network using electric supply conductors L as transmission supports. The electric supply network connects different taps P together, possibly via an electric distribution table provided with circuit breakers or the like (not shown). Taps P have been symbolized in FIG. 1 as being taps with three conductors (phase, neutral and ground). However, these also may be taps only having two conductors (phase and neutral). From the point of view of the transmission network, each tap is considered as a node. In the example of FIG. 1, a network with eight nodes N1, N2, N3, N4, N5, N6, N7, N8 is considered.

Among the various electric devices connected to the network, devices 1 (a single one has been shown as connected to node N7 for simplification) are equipped with a modem (MODEM) to communicate over the network.

Other "non-communicating" devices can, of course, also be connected for supply by the mains.

Reference will be made hereafter to the network nodes, it being understood that this designation generally encompasses the modem connected on this node and which includes the different circuits adapted to exchanging data.

According to the preferred embodiment of the present invention, each node is assigned two transmit frequency sets and two receive frequency sets used as carriers by the transmitted and received OFDM symbols. Table I hereafter shows the example of assignment of the sixteen frequency sets FB1 to FB16 of the network of FIG. 1.

TABLE I

| Node | Transmission | Reception |
| --- | --- | --- |
| 1 | FB1, FB2 | FB9, FB13 |
| 2 | FB3, FB4 | FB10, FB14 |
| 3 | FB5, FB6 | FB11, FB15 |
| 4 | FB7, FB8 | FB12, FB16 |
| 5 | FB9, FB10 | FB1, FB5 |
| 6 | FB11, FB12 | FB2, FB6 |
| 7 | FB13, FB14 | FB3, FB7 |
| 8 | FB15, FB16 | FB4, FB8 |

The fact that each node can transmit over two distinct frequency sets improves the network reliability. Indeed, if one of the sets is in a frequency band corrupted by other devices connected on the network (for example, electric devices), the transmission can be properly carried out on the other set.

The frequency set assignment such as described hereabove enables each node desiring to transmit to another node to have, so to speak, several available frequency "paths" which, for some of them, transit via one or several other network nodes then used as relays.

Figure 2:
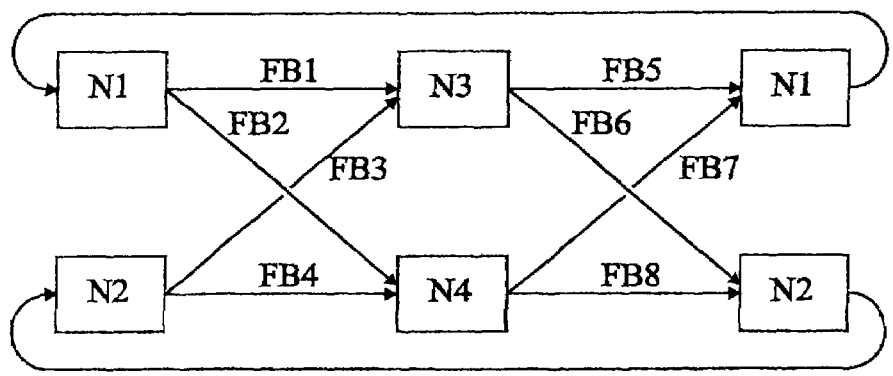
FIG. 2 illustrates the operation of a four-node transmission network according to the preferred embodiment of the present invention.

FIG. 2 illustrates, in a representation of a simplified four-node network, this operation. It being a network with four nodes (N1 to N4), the number of frequency sets is 8 (FB1 to FB8). The different transmission paths or possibilities have been symbolized by arrows referenced according to the frequency set used. Table II hereafter reproduces the different frequency sets usable to transmit from one node to another.

TABLE II

| Begin node | End node | Relay node(s) | Frequency set(s) |
| --- | --- | --- | --- |
| N1 | N2 | N3 | FB1, FB6 |
|  |  | N4 | FB2, FB7 |
| N1 | N3 | — | FB1 |
|  |  | N4, N2 | FB2, FB8, FB3 |
| N1 | N4 | — | FB2 |
|  |  | N3, N2 | FB1, FB6, FB4 |

TABLE II-continued

| Begin node | End node | Relay node(s) | Frequency set(s) |
|---|---|---|---|
| N2 | N3 | — | FB3 |
|  |  | N4, N1 | FB4, FB7, FB1 |
| N2 | N4 | — | FB4 |
|  |  | N3, N1 | FB3, FB5, FB2 |
| N2 | N1 | N3 | FB3, FB5 |
|  |  | N4 | FB4, FB7 |
| N3 | N4 | N1 | FB7, FB1 |
|  |  | N2 | FB6, FB3 |
| N3 | N1 | — | FB5 |
|  |  | N2, N4 | FB6, FB4, FB7 |
| N3 | N2 | — | FB6 |
|  |  | N1, N4 | FB5, FB2, FB8 |
| N4 | N1 | — | FB7 |
|  |  | N2, N3 | FB8, FB3, FB5 |
| N4 | N2 | — | FB8 |
|  |  | N1, N3 | FB7, FB1, FB6 |
| N4 | N3 | N1 | FB7, FB1 |
|  |  | N2 | FB8, FB3 |

It can be seen that, whatever the transmit node, said node has two available paths using different frequency sets to reach any other node. The "price" to pay is a slight lengthening of the transmission durations due to the possible relays. However, this price is negligible as compared to the great advantage of being able to communicate with any node of a network by using simplified Fourier transform circuits to only process two sets of frequencies in inverse transform (transmission) and two sets of frequencies in direct transform (reception), and this, whatever the size (number of nodes) of the network.

Another advantage of the present invention is that the network can adapt in real time to possible changes in the transfer function by choosing one or the other of the available paths.

As an alternative, more than two frequency sets may be assigned to each node and each transmit direction. This increases the number of possible paths, and thus the robustness of the network against disturbances, but requires larger and larger Fourier transform circuits.

Figure 3:
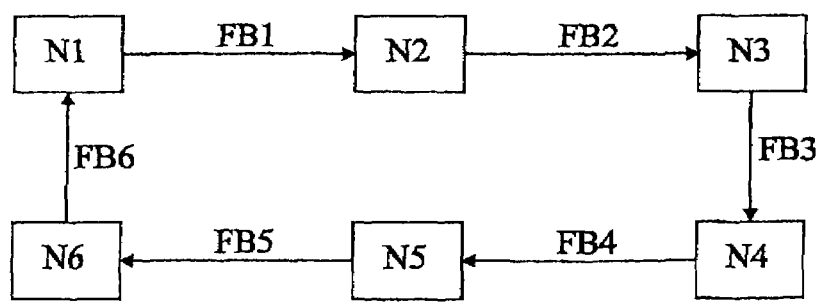
FIG. 3 illustrates another embodiment of the present invention.

FIG. 3 illustrates the operation of a network with six nodes according to another embodiment of the present invention. According to this embodiment, one transmit frequency set and one receive frequency set are assigned to each network node and this assignment is circular. In other words, a transmission between two nodes of the network requires between 0 and n−2 relays, where n represents the number of network nodes, and thus between one and n−1 transmissions between two directly communicating nodes. As compared to the preferred embodiment, the embodiment of FIG. 3 does not increase the network robustness but fulfils the object of simplifying the modem circuits.

An advantage of the present invention is that it requires no control channel to manage the network. Indeed, each node is used as a relay (repeater) and decides whether the received data are intended for it or must be transmitted to another node. In a conventional manner, the addressee is included in a message header, and the receive modem can thus determine whether it is the addressee once it has demodulated the message. This demodulation is anyway necessary to transmit, if necessary, the message to another node by modulating it back since the carriers are then different.

The frequency set management can be carried out in different manners.

Once the frequency sets have been assigned, each modem has, for example in its memory, a table for assigning the different frequency sets to the different nodes of the entire network. It can thus, upon reception of a message to be transmitted, know which path to follow.

The frequency assignments are performed by conventional means, taking account of the criteria of the present invention and of the fact that the modulation is an amplitude and phase quadrature modulation. Constellations of more or fewer points may be used (for example, between 4 and 1024 points) according to the signal-to-noise ratio. It will only be ascertained, as is conventional, to avoid overlapping the next constellation point with the noise of the involved point.

To make the frequency separation by filtering means (analog or digital depending on the embodiment) and the processing by the Fourier transform circuits easier, the frequency sets are preferably gathered in frequency bands rather than interlaced with frequencies of other sets.

The frequency set assignment may be performed in different ways, provided to respect the described functionalities. Preferably, the frequency sets are distributed to maximize the number of nodes able to communicate with different sets. However, according to other constraints (for example, linked to the desired rates, which can be different according to the nodes, to the priority management, to the implementation specificities), other frequency set distributions may be used.

According to a first example, each modem itself assigns its own bands to itself from the available bands when it connects to the network. Either another assignment table, or an assignment algorithm within the abilities of those skilled in the art, are used. Signaling sub-bands in each frequency band or set are then used. These sub-bands convey the same information. The first modem transmits the identification of the frequency sets that it has chosen in the signaling sub-band. The next modem to connect reads this information and takes it into account to choose its own frequency sets.

According to a second example, the frequency sets are pre-programmed by software or hardware means (mechanical switch bar) in each modem.

In the preferred embodiment of FIG. 1, the frequency set assignment is performed by applying the following relations. An arbitrary order number (between 1 and n, where n represents the number of nodes in the network) given to each modem or node (in the example, N1 to N8) is designated as i. An arbitrary order number given to each frequency set is designated as j (preferably, the successive numbers do not correspond to frequency sets of successive values). In the example of FIG. 1, j ranges between 1 and 16 (1 and 2n). For the transmit sets, the sets are assigned in the order, two by two. The modem of rank i is thus assigned the sets of rank j=2i−1 and j=2i. More generally, designating by k the number of sets assigned to each node, a node of rank i is assigned the k nodes of rank j between k(i−1)+1 and ki.

For the receive sets, the sets are distributed so that the same modem is only assigned sets of rank j different from one another and from the transmit sets. There exist a great number of possibilities and those skilled in the art will be able to choose an adapted assignment method.

The frequency set assignment may be dynamically performed. For example, the assignment algorithm may take into account the reception quality of the different channels to select the path to be followed.

To guarantee an optimal operation of the direct Fourier transforms in receive mode, a cyclic prefix and suffix are preferably provided in each transmission flow, for each transmitted OFDM symbol. This amounts, in the time field and upon transmission of each symbol, to copying a predetermined number of samples, respectively of the end and of the beginning of the symbol, and to inserting these copies at the beginning and at the end of the symbol to fill the inter-symbol intervals. The number of samples copied (or the duration of the prefixes and suffixes) is the same for all transmission flows, but the prefixes may have durations different from those of the suffixes.

The cyclic prefix of each symbol amounts, in the time field, to providing a replica of the last few microseconds of the OFDM symbol which is copied before the symbol, in the dead time separating two symbols. The function of the cyclic prefix is to absorb the inter-symbol interferences which result from the fact that the delay of a channel is not constant with frequency (that is, the pulsed response of the transmission channel). The use of a cyclic prefix for OFDM symbols in a network using the mains as a transmission support is known from above-mentioned article "HomePlug Standard Brings Networking to the Home".

The prefix and the suffix provided by the present invention are used to avoid use of analog filters. Indeed, by repeating part of the data at the beginning and at the end of a symbol, discontinuities upon reception of different symbols simultaneously received by different nodes are avoided. Such discontinuities translate, on the receive side upon direct Fourier transform, by noise extending over the adjacent frequencies (carriers), which adversely affects a proper reception. Since, according to the present invention, dead times between symbols are filled in the time field by the repeated data and the operation of a direct Fourier transform is cyclic, the point at which a symbol starts being taken into account can vary within the interval containing the signal, that is, the symbol duration plus the prefixes and suffixes, without for any information to be lost. This amounts to saying that the carriers of the different symbols keep their orthogonality in the frequency field. It is thus possible to no longer use analog filters, but rather only demodulate the receive frequencies assigned to the receiver. This is made possible since, moreover, each modem (generally, each node) is assigned one transmit frequency set and one receive frequency set.

Further, the present invention requires no time-division multiple access, which results in a greater general capacity, as well as in a more efficient priority and service quality management control.

The length of the cyclic suffix is chosen according to the propagation delays of the network and, more specifically, to the reflection or reception delay of the signals on a given node. Preferably, the transmission of the different modems is synchronized so that all modems connected to the network nodes transmit at the same time, or the symbols are shaped before transmission to avoid inter-carrier interference. In this case, the suffix duration may advantageously be limited to once the maximum propagation time in the network, taking into account all possible reflections and paths (multiple-paths).

Use of a synchronization of the transmissions can be avoided by shaping the OFDM symbols to be transmitted to avoid, upon reception on the same node, intercarrier interference of several symbols transmitted by different nodes. Such a shaping technique is well known in other fields of application of OFDM symbols such as, for example, the reception of video signals on reception antennas of terrestrial radio signals (rack antenna) or telephony, and is described, for example, in above-mentioned article "Zipper VDSL: A Solution for Robust Duplex Communication over Telephone Lines" by Denis J. G. Mestdagh, Michael R. Isaksson, and Per Ödling, published in May 2000 in IEEE Communication Magazine, pages 90 to 96, which is incorporated herein by reference. Such a shaping however requires grouping the carriers of each set assigned to each node.

To avoid use of complex equalizers in receive mode and to avoid intersymbol interference, the duration of the cyclic prefixes is greater (at least equal) to the pulsed response of the transmission network.

It should be noted that, to implement the present invention, all OFDM symbols should have the same length (duration T). This length is defined by interval $\Delta f$ between two successive carriers of the amplitude and phase quadrature modulation ($T=1/\Delta f$).

The possible synchronization of the network nodes may be performed independently. For example, a signaling channel which conveys a reference time signal of the network may be used. It is assumed that all modems are plugged on mains connection taps. Upon turning-on of one of the modems, said modems permanently sends a specific OFDM signal formed of predefined data over a predefined signaling frequency set. Upon reception by another turned-on modem, the latter immediately sends back a response signal on another predefined signaling frequency. When the first modem receives the response, it can calculate the propagation duration that it sends back in a specific channel. Upon reception of the content of this channel, the second modem now knows the duration to be applied for a transmission to its own OFDM signals, so that the two above-mentioned modems are now capable of transmitting signals at the same time.

During this initialization phase, collisions may occur if another modem performs the same operation as the second one. This problem can be solved by providing random mechanisms which consist, when a collision occurs, of placing each node in a waiting mode for a duration determined by a random generator. This random receiver allows again the involved modem to subsequently restart some initialization cycles.

Of course, the present invention is likely to have various alterations, modifications, and improvements which will readily occur to those skilled in the art. In particular, the implementation of the transmission method of the present invention is within the abilities of those skilled in the art based on the functional indications given hereabove. Further, although the present invention has been described in more specific relation with a network using the power cables as a transmission support, the present invention may also apply to any other point-to-multipoint or multipoint-to-multipoint network in which similar problems are posed. As an example, applications to wireless communications in which the problems of the variation of the transfer function along time are posed, and which are multiple-path and multiple-reflection communications, will be mentioned.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for transmitting data between two nodes of an orthogonal frequency-division multiplexing network, including the steps of:

assigning to each node at least one transmit frequency set and at least one receive frequency set, the transmit set of each node being different from its own receive set; and using each node as a relay for transmitting back a transmission which is not intended for the node,
wherein each node is assigned at least two transmit sets and at least two receive sets,
wherein the receive sets of a node correspond to the transmit sets of at least two other distinct nodes, and
wherein a node of rank i ranging between 1 and n is assigned in transmit mode the k frequency sets of rank k(i−1)+1 to ki, where k represents a number of sets assigned in each direction to each node and the frequency sets are numbered from 1 to kn.

2. The method of claim 1, wherein each set is assigned only once in transmission for the entire network.

3. The method of claim 1, wherein each set is assigned only once in reception for the entire network.

4. The method of claim 1, wherein the transmit sets of a node correspond to receive sets of at least two other distinct nodes.

5. A method for transmitting data between two nodes of an orthogonal frequency-division multiplexing network, including the steps of:
assigning to each node at least one transmit frequency set and at least one receive frequency set, the transmit set of each node being different from its own receive set; and
using each node as a relay for transmitting back a transmission which is not intended for the node,
wherein a cyclic prefix and a cyclic suffix reproducing a predetermined number of samples, respectively of the end and of the beginning of a transmitted symbol containing the data, are added to each transmitted symbol.

6. The method of claim 5, wherein the beginning times of symbol transmission from all nodes are synchronized.

7. The method of claim 5, further including shaping the symbol to be transmitted to avoid intercarrier interference.

8. A modem of an orthogonal frequency-division multiplexing transmission network in which data is transmitted from a first node to a second node, the modem comprising:
means for assigning at least one transmit frequency set and at least one receive frequency set to the modem, the transmit set being different from the receive set; and
means for using the modem for relaying data which is addressed to another node,
wherein each node is assigned at least two transmit sets and at least two receive sets,
wherein the receive sets of a node correspond to the transmit sets of at least two other distinct nodes, and
wherein a node of rank i ranging between 1 and n is assigned in transmit mode the k frequency sets of rank k(i−1)+1 to ki, where k represents a number of sets assigned in each direction to each node and the frequency sets are numbered from 1 to kn.

9. The modem of claim 8, including means for detecting, in a transmitted message, whether the modem is the addressee of the message and, if not for transmitting the message to another network node on another frequency set.

10. An orthogonal frequency-division multiplexed (OFDM) network for communicating OFDM symbols, comprising:
a plurality of interconnected nodes, each of the nodes relaying a symbol addressed to another of the nodes, each of the nodes having at least one assigned transmission frequency set and at least one assigned receive frequency set,
wherein, for a given node, each transmission frequency set is different from each receive frequency set,
wherein each frequency set is an assigned transmission frequency set of only one of the nodes and is an assigned receive frequency set of only one of the nodes, and
wherein each of the nodes is assigned a rank i ranging between 1 and n and is assigned in transmit mode the k frequency sets of rank k(i−1)+1 to ki, where k represents a number of frequency sets assigned in each of the transmission direction and the receive direction, and the frequency sets are numbered from 1 to kn.

11. The network of claim 10, wherein each of the nodes has at least two assigned transmission frequency sets and at least two assigned receive frequency sets.

12. The network of claim 10, wherein at least two of the nodes are coupled to communicate with one another using an electric supply conductor.

13. The network of claim 10, wherein only one transmit frequency set and one receive frequency set are assigned to each of the nodes, whereby the network is configured as a loop.

14. The network of claim 10, wherein each of the nodes has a memory, the memory having a table indicating the frequency sets assigned to each of the nodes.

15. The network of claim 14, wherein each of the nodes assigns its own receive frequency set and transmission frequency set and is adapted to transmit an identification of its assigned receive frequency set and assigned transmission frequency set on a sub-band.

16. The network of claim 10, wherein each of the nodes is preprogrammed to have an assigned transmission frequency set and an assigned receive frequency set.

17. The network of claim 10, wherein symbol transmissions from each of the nodes are synchronized.

18. A method of communicating symbols in an orthogonal frequency-division multiplexing network including a plurality of nodes, comprising:
assigning to each of the nodes at least one transmit frequency set and at least one receive frequency set, such that for each of the nodes, the transmit frequency set is different from the receive frequency set;
transmitting, from a first of the nodes, a symbol addressed to a second of the nodes; and
each of the nodes relaying a received symbol which is addressed to another of the nodes, wherein each of the nodes is assigned at least two transmit frequency sets and at least two receive frequency sets,
wherein for each of the nodes, a first of the at least two assigned receive frequency sets is the same as a transmit frequency set of a second of the nodes, and a second of the at least two assigned receive frequency sets is the same as a transmit frequency set of a third of the nodes, and
wherein each of the nodes is assigned a rank i ranging between 1 and n, and a node having a rank i is assigned in transmit mode the k frequency sets of rank k(i−1)+1 to ki, where k represents the number of frequency sets assigned in each of the transmit direction and the receive direction for to each node, whereby a total of kn transmit frequency sets are assigned.

19. The method of claim 18, wherein each frequency set is assigned as a transmission frequency set for only one of the nodes.

20. The method of claim 18, wherein each frequency set is assigned as a receive frequency set for only one of the nodes.

21. The method of claim 18, wherein for each of the nodes, a first of the at least two assigned transmit frequency sets is the same as a receive frequency set of a second of the nodes, and a second of the at least two assigned transmit frequency sets is the same as a receive frequency set of a third of the nodes.

22. The method of claim 18, further comprising adding a cyclic prefix and a cyclic suffix to each of the transmitted symbols, the cyclic prefix and the cyclic suffix for a given symbol being a reproduction of a predetermined number of samples, from the end of the given symbol and from the beginning of the given symbol, respectively.

23. The method of claim 22, wherein symbol transmissions from each of the nodes are synchronized.

24. The method of claim 22, further comprising shaping the transmitted symbols to avoid intercarrier interference.

* * * * *